Sept. 8, 1936.  R. C. BERRY  2,054,047
CHANGE SPEED TRANSMISSION
Filed Nov. 30, 1934   2 Sheets-Sheet 2

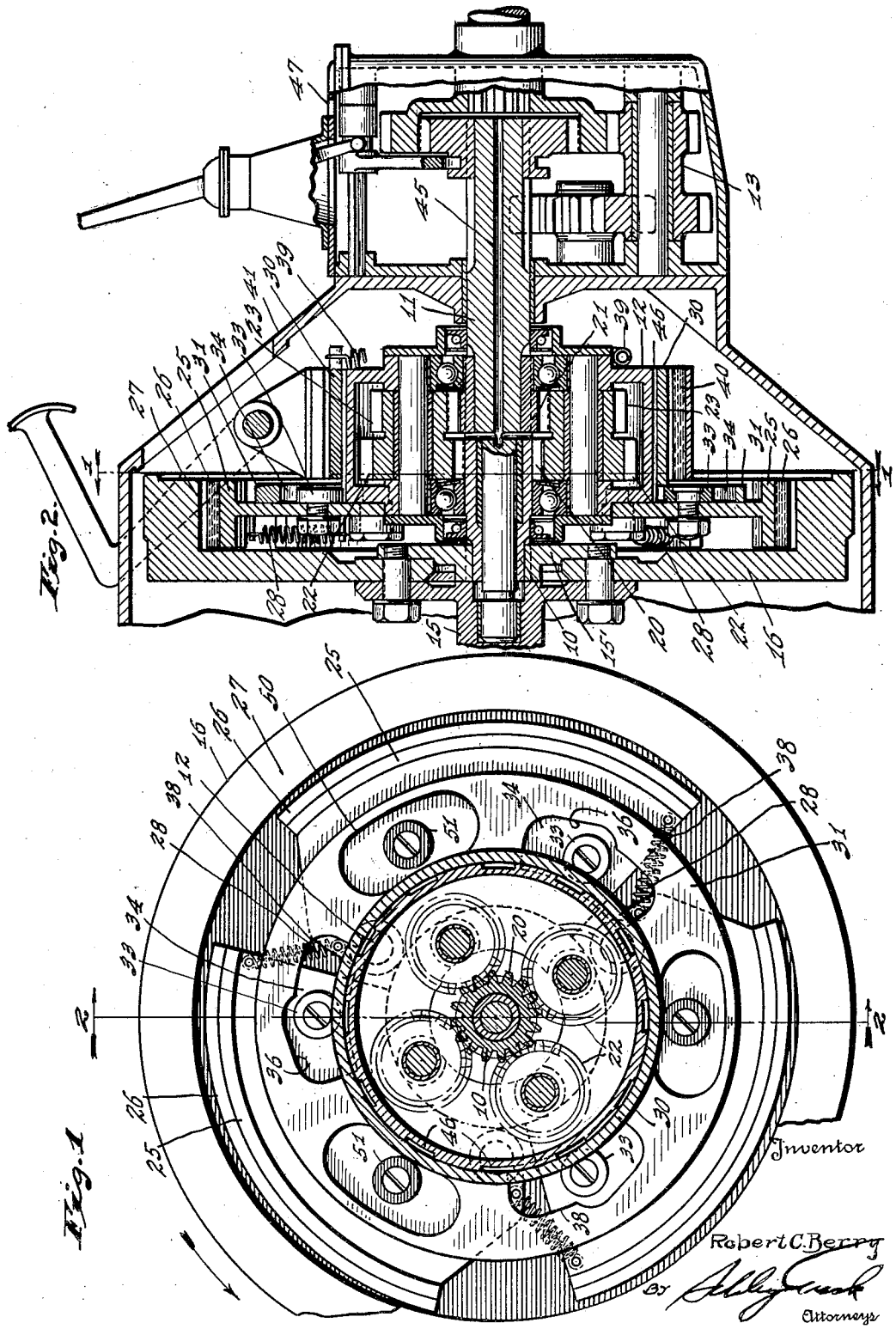

Inventor
Robert C. Berry,
By
Attorneys

Patented Sept. 8, 1936

2,054,047

UNITED STATES PATENT OFFICE 2,054,047

CHANGE-SPEED TRANSMISSION

Robert C. Berry, Indianapolis, Ind., assignor to Klaisler-Berry Engineering Company, Indianapolis, Ind., a corporation of Indiana Application November 30, 1934, Serial No. 755,327

6 Claims. (Cl. 74—260)

My invention relates to change-speed transmission mechanism, and it is my object to produce a device of this character especially suited for use in automobiles. The present invention relates to an improvement on the device illustrated and described in the co-pending application of myself and Dewey E. Gommel, Serial No. 716,954, filed March 23, 1934.

The device of that prior application comprises a planetary transmission including co-axial driving and driven elements and a rotatable planet carrier rotatably supporting pairs of planet gears interconnecting such driving and driven elements. Upon the carrier there was mounted a series of friction-clutch shoes adapted to move outwardly under the influence of centrifugal force into engagement with a portion of the rotatable driving member of the transmission to clutch the driving member and carrier together whenever the rotative speed of the carrier reached or exceeded a predetermined maximum. Loosely mounted upon the carrier there was a ring, such ring and the aforesaid shoes having co-operating provisions by means of which the shoes could be drawn inwardly from their clutching position when the ring rotated in one direction from a normal position relative to the carrier. Associated with the ring there was brake mechanism by means of which its rotation could be oposed so that continued rotation of the carrier in one direction would result in a relative displacement of the ring and a retraction of the clutch shoes.

According to the present invention, the co-operating provisions provided on the ring and shoes are so arranged that the shoes are held inwardly out of their clutching position when the ring is in either of its limit positions relative to the carrier.

Figure 3:
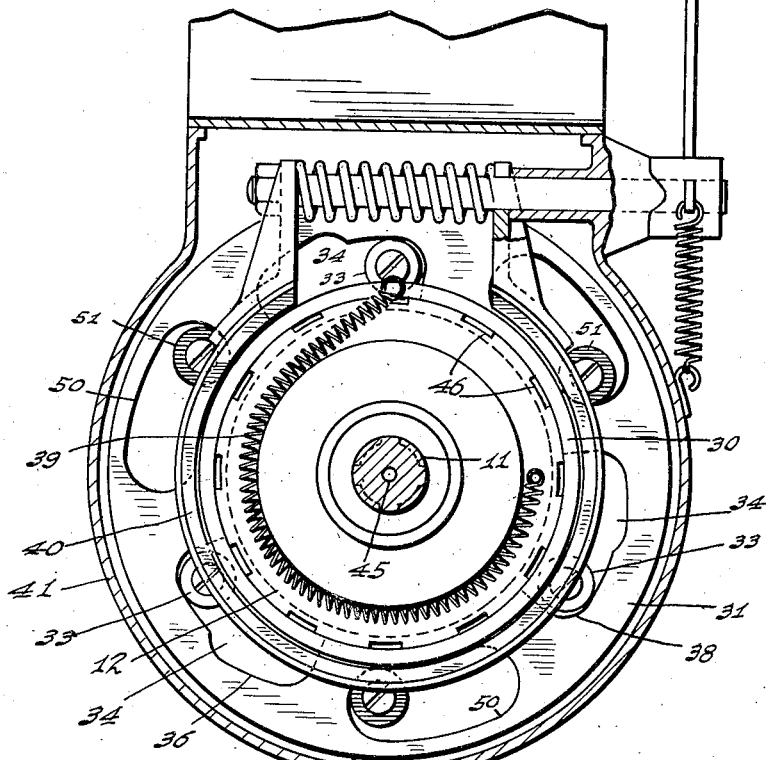
Figure 4:
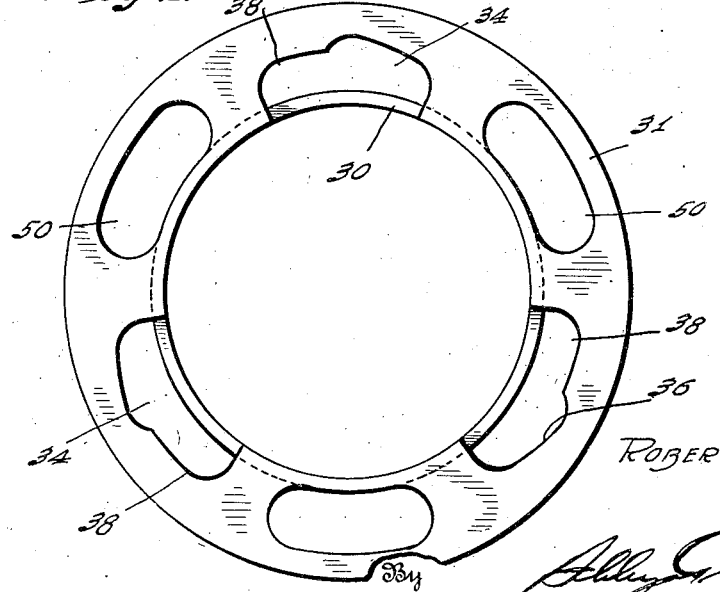

The accompanying drawings illustrate my invention: Fig. 1 is a transverse section through the transmission on the line 1—1 of Fig. 2; Fig. 2 is a vertical axial section on the line 2—2 of Fig. 1; Fig. 3 is a rear elevation of the transmission; and Fig. 4 is an end elevation of the shoe-controlling ring alone.

The transmission shown comprises a rotatable driving member in the form of a sleeve 10, a rotatable driven member 11, and a rotatable planet-gear carrier 12, all such parts being co-axial. When the transmission is to be used in an automobile, the driven element 11 will be operatively connected to the drive wheels, preferably through a reversing mechanism 13 of any desired form, while the driving member 10 will be connected to the crankshaft 15 of the automobile engine as by being splined to a coupling member 15' which is secured to the rear face of the usual flywheel 16, conveniently through the medium of the same screws that secure the flywheel to the crankshaft.

Rigid with the driving and driven members respectively are two gears 20 and 21 operatively interconnected by planet gears 22 and 23 which are rigid with each other and which mesh respectively with the gears 20 and 21, such planet gears being rotatably supported in the carrier 12.

Pivoted to the carrier 12 at angularly spaced points are a plurality of shoes 25 each of which has an arcuate outer portion preferably faced with friction material 26 shaped to conform to the inner surface of an annular flange 27 which projects rearwardly from the flywheel 16. The point of pivotal attachment of each of the shoes 25 to the carrier 12 is angularly displaced from the center of gravity of the shoes, so that as the carrier rotates centrifugal force tends to throw the shoes outwardly into clutch engagement with the flange 27, this tendency being resisted by any suitable means such as the springs 28.

The carrier 12 has rotatably mounted upon it a ring 30, which is provided with an outwardly projecting flange 31 overlying the rear faces of the shoes 25.

Each of the shoes 25 has mounted upon it a roller 33 disposed within a slot 34 in the ring-flange 31. Assuming that the flywheel 16 normally rotates in a counterclockwise direction as indicated by the arrow in Fig. 1, the wall of each of the slots 34 is formed to provide a cam surface 36 so shaped as to engage the roller 33 and force its associated shoe inwardly when the ring 30 is rotated in a clockwise direction relative to the carrier. In addition, each of the slots 34 is formed with a clockwise extension 38 adapted to receive the roller 33 when, with the associated shoe in its innermost position, the ring 30 is rotated in a counterclockwise direction relative to the carrier. A spring 39 acts between the ring 30 and carrier 12 and tends to maintain the ring in its counterclockwise limit of movement on the carrier with the rollers 33 in the slot extensions 38, as shown in Fig. 3.

Associated with the ring 30 and carrier 12 is suitable manually operable brake mechanism including a brake band 40 which surrounds the ring 30. This brake band 40 is supported from a suitable enclosing casing 41 and tends, when contracted, to prevent rotation of the ring 30.

With the driven element 11 of the transmission connected to the drive wheels of the automobile and with the automobile stationary, forward rotation of the flywheel 16 in the counterclockwise direction (Fig. 1) will cause the planet-carrier 12 to rotate in the clockwise direction. With the brake-band 40 expanded the ring will be free to rotate with the carrier and will be held by the spring 39 in the position shown in Fig. 3 where the rollers 33 will be disposed in the extensions 38 of the notches 34 in the ring-flange 31. The presence of the rollers 33 in the extensions 38 prevents any outward movement of the shoes 25, which therefore remain in retracted position irrespective of the speed of the carrier 12 in a clockwise direction. This is one of the main features distinguishing the device of this application from that of the aforesaid prior application of myself and Dewey E. Gommel; for in that prior application no means was provided for positively retaining the shoes in retracted position while the carrier was rotating in the reverse, or clockwise, direction. As a result, in that aforesaid application the maximum speed of the carrier in the reverse direction was limited to the speed at which the shoes moved outwardly into clutching engagement with the engine flywheel. In the device of the present application, the shoes are positively retained in retracted position irrespective of the rotational speed of the carrier in the reverse direction, and there is therefore no limit to the speed of the carrier in the reverse direction. This permits the engine to be operated at any desired speed while the automobile remains stationary.

When it is desired to start forward movement of the automobile, the brake-band 40 is tightened upon the ring 30, thus stopping rotation of the ring. Since the extent of relative rotation of the ring and carrier is limited, the carrier 12 is also brought to rest when the brake-band 40 is tightened. When this occurs, the driven element 11 of the transmission, which is connected to the drive wheels of the automobile, is driven through the gears 20—22—23—21 in a forward direction at reduced speed ratio, such speed ratio being maintained as long as the brake-band 40 is tightened.

When the operator desires to increase the speed ratio between the driving element 10 and driven element 11, he releases the brake-band 40 and decelerates the engine. The deceleration of the engine tends to cause the carrier 12 to rotate in a forward, or counterclockwise (Fig. 1), direction; and, as the brake-band 40 is released, the carrier is free so to rotate. The spring 39 is so proportioned that the inertia of the ring 30, as the carrier accelerates forwardly, will cause the ring to lag behind the carrier or to move in a clockwise direction thereto thus freeing the rollers 33 from the slot-extensions 38.

As the engine continues to decelerate, the speed of the carrier 12 in the forward direction increases until it reaches the point at which the shoes 25 move outwardly into clutching engagement with the flange 27 on the flywheel 16. The springs 28, which govern the speed at which the shoes 25 move outwardly are so proportioned that the shoes will move into clutching engagement with the flange 27 of the flywheel 16 while the flywheel is still rotating at a higher rate of speed than is the carrier. When, therefore, the shoes 25 engage the flange 27, the speed of the carrier is immediately increased to enhance the clutching action of the shoes. When the shoes 25 firmly engage the flange 27, the driving element 10 and the driven element 11 are operatively interconnected for a direct drive.

Before the shoes move outwardly as just set forth, the rollers 33 are in the counterclockwise ends of the slots 34 where the cam surfaces 36 tend to prevent outward movement of the shoes. This tendency, however, is limited by the inertia of the ring, which is not great enough to prevent centrifugal force from moving the shoes outwardly when the critical speed of the carrier 12 is attained, the rollers 33 camming the ring 30 forwardly to bring it to the position shown in Fig. 1 as the result of the radial inclination of the cam surfaces.

When it is desired to change from the direct drive just described to the drive at reduced speed ratio provided through the gearing 22—23—21, the brake-band 40 is contracted to stop rotation of the ring 30. As the carrier 12 continues to rotate, the rollers 33 on the shoes 25 engage the cam surfaces 36 which act positively to retract the shoes and to free the carrier from its direct connection with the flywheel 16 of the engine. The carrier thereupon comes to rest and the interconnection of the driving element 10 and driven element 11 of the transmission at reduced speed-ratio is effected.

To prevent the creation within the interior of the carrier 12 of a pressure which would tend to force lubricant out of the carrier, I vent the interior of the carrier by means of an axial passage 45 in the driven element 11 of the transmission. At its forward end, the passage 45 communicates with one or more radial passages 46 which, in turn, communicate with the interior of the carrier 12; while at its rear end the passage 45 opens into the interior of a vented housing 47 enclosing the reversing mechanism 13.

When the transmission is at rest lubricant within the interior of the carrier will be disposed at the bottom thereof; while, when the transmission is in operation, the lubricant will be disposed by the action of centrifugal force in the outer portions of the carrier. Thus, while the passage 45 prevents the building up of any pressure within the carrier, none of the lubricant can escape through it.

The presence of the rollers 33 in the slots 34 limits the relative angular movement of the ring 30 and carrier 12, which limitation is necessary in the operation of the device. Because of the possibility of noise arising from contact of the metal rollers 33 with the ends of the slots in the metal ring, however, I prefer to provide other means for limiting angular movement of the ring on the carrier. To this end, I may provide the ring-flange 31 with one or more additional slots 50 for the reception of bumpers 51 of rubber or other resilient material mounted on the sides of the shoes 25. The slots 50 are wide enough so as not to interfere with radial movement of the shoes.

I claim as my invention:

1. A change-speed transmission, comprising coaxial driving and driven sun gears and a planet-gear carrier, one or more pairs of planet gears rotatably mounted in said carrier and operatively interconnecting said sun gears, a clutch element rotatable with one of said sun gears, one or more clutch shoes mounted on said carrier and movable under the influence of centrifugal force into clutching engagement with said clutch element when the rotational speed of the carrier exceeds a predetermined value, a ring rotatably mounted on said carrier, means limiting to a predetermined extent relative rotation of said carrier and ring in both directions from a normal position, said ring and each of said shoes having co-operating provisions for holding said shoes inwardly against the action of centrifugal force when the ring is moved in either direction from its normal position relative to said carrier, and a brake co-operating with said ring and operable to hold said ring stationary.

2. A change-speed transmission, comprising coaxial driving and driven sun gears and a planet-gear carrier, one or more pairs of planet gears rotatably mounted in said carrier and operatively interconnecting said sun gears, a clutch element rotatable with one of said sun gears, one or more clutch shoes mounted on said carrier and movable under the influence of centrifugal force into clutching engagement with said clutch element when the rotational speed of the carrier exceeds a predetermined value, a ring rotatably mounted on said carrier, means limiting to a predetermined extent relative rotation of said carrier and ring in both directions from a normal position, means operative to hold said shoes inwardly against the action of centrifugal force when the ring is moved in either direction from its normal position relative to said carrier, and a brake co-operating with said ring and operable to hold said ring stationary.

3. A change-speed transmission, comprising coaxial driving and driven sun gears and a planet-gear carrier, one or more pairs of planet gears rotatably mounted in said carrier and operatively interconnecting said sun gears, a clutch element rotatable with one of said sun gears, one or more clutch shoes mounted on said carrier and movable under the influence of centrifugal force into clutching engagement with said clutch element when the rotational speed of the carrier exceeds a predetermined value, a ring rotatably mounted on said carrier, yielding means tending to rotate said ring in one direction on said carrier, provisions operative to hold said shoes out of clutching engagement when said ring is moved on said carrier under the influence of said spring, said spring being yieldable under the influence of the inertia of said ring when the carrier accelerates to render said provisions inoperative, and a brake co-operating with said ring and operable to hold said ring stationary.

4. A change-speed transmission, comprising coaxial driving and driven sun gears and a planet-gear carrier, one or more pairs of planet gears rotatably mounted in said carrier and operatively interconnecting said sun gears, clutch means operatively connected to said carrier and responsive to the speed thereof, a control member rotatably mounted on said carrier and rotatable thereon in one direction to render said clutch means inoperative, and yielding means acting on said control member and tending to move it in such direction, said yielding means being yieldable under the influence of the inertia of said member when the carrier accelerates to render said clutch means operative.

5. A change-speed transmission, comprising coaxial driving and driven sun gears and a planet-gear carrier, one or more pairs of planet gears rotatably mounted in said carrier and operatively interconnecting said sun gears, clutch means operatively connected to said carrier and responsive to the speed thereof, a control member rotatably mounted on said carrier and rotatable thereon in one direction to disengage said clutch and in the other direction to restrain the clutch from engagement irrespective of carrier speed, yielding means tending to move said control member in the latter direction, said yielding means being yieldable under the influence of the inertia of said member when the carrier accelerates to free said clutch from restraint, and a brake co-operating with said ring.

6. A change-speed transmission, comprising coaxial driving and driven sun gears and a planet-gear carrier, one or more pairs of planet gears rotatably mounted in said carrier and operatively interconnecting said sun gears, clutch means operatively connected to said carrier and responsive to the speed thereof, and means normally operative to restrain said clutch from engagement but responsive to acceleration of the carrier in one direction and releasable under the influence of such acceleration to free the clutch from restraint.

ROBERT C. BERRY.